United States Patent [19]

Nishikawa

[11] Patent Number: 4,846,314
[45] Date of Patent: Jul. 11, 1989

[54] AUTOMATIC GAP ADJUSTMENT DEVICE FOR DISC BRAKE

[75] Inventor: Yutaka Nishikawa, Hanyu, Japan

[73] Assignee: Akebono Brake Industry Co., Ltd., Tokyo, Japan

[21] Appl. No.: 220,157

[22] Filed: Jul. 18, 1988

[30] Foreign Application Priority Data

Aug. 4, 1987 [JP] Japan .................................. 62-194610

[51] Int. Cl.⁴ ............................................. F16D 65/56
[52] U.S. Cl. ................................. 188/196 D; 188/71.9
[58] Field of Search ............... 188/71.9, 79.62, 196 D, 188/196 BA

[56] References Cited

U.S. PATENT DOCUMENTS 3,770,082 11/1973 Brooks et al. ............... 188/196 D X
4,596,315 6/1986 Takeuchi et al. ........... 188/196 D X
4,598,800 7/1986 Marianu ....................... 188/196 D X

FOREIGN PATENT DOCUMENTS 1540084 2/1979 United Kingdom .

Primary Examiner—Duane A. Reger
Attorney, Agent, or Firm—Cushman, Darby & Cushman

[57] ABSTRACT

An automatic gap adjustment device for a disc brake comprising a cup-shaped piston which has a bottom in the fore end thereof and is arranged to move within a cylinder of a caliper, a sleeve which is axially disposed within the piston and is arranged to be carried by the piston when the piston is moved forward by the action of hydraulic pressure, and a spindle which is in screwed engagement with the piston and is arranged to rotate and screw out from the sleeve rearward relative to the piston. The automatic gap adjustment device is arranged to have the hydraulic pressure received as a moving force directed toward the rear part of the spindle, to have an adjuster piston arranged within a cylinder to push and cause a protruding end part of the spindle which protrudes toward the rear of the sleeve to engage an engaging part provided within the cylinder.

7 Claims, 1 Drawing Sheet

AUTOMATIC GAP ADJUSTMENT DEVICE FOR DISC BRAKE

BACKGROUND OF THE INVENTION

1. Field of the Invention

This invention relates to a disc brake operated by hydraulic pressure and more particularly to an automatic gap adjustment device for the disc brake which is capable of automatically adjusting a clearance or gap formed between a rotating disc rotor and pads arranged to be pushed against the disc rotor.

2. Description of the Prior Art

The automatic gap adjustment device for a disc brake has been disclosed, for example, in the patent specification of British Pat. No. 1,540,084. In the case of this patent specification, a reversibly screw coupled combination of a nut and a push rod is inserted into each of a pair of pistons. An end face of the nut is pushed against one of the pistons by means of a spring to restrain the nut from turning round. Meanwhile, the push rod is arranged to turn round and screw outward to move its head part away from a member limiting the rotation of the push rod when hydraulic pressure acts between the two pistons. A clearance or gap between a disc rotor and pads is thus arranged to be automatically adjusted to prevent it from exceeding a necessary range.

However, the above-stated automatic gap adjustment device has a drawback in that a working hydraulic liquid supplied to a part between the pair of pistons tends to leak to an atmospheric pressure space on the side of the head part of the push rod. More specifically, the device disclosed by British Pat. No. 1,540,084 has the above-stated nut inserted in a blind hole of one of the cup-shaped pistons. Meanwhile, the push rod which is in screwed engagement with the nut is inserted into the other piston which has a through hole in the head part thereof. The leak of the working hydraulic liquid to the head side of the push rod is arranged to be prevented by mounting a seal ring on the push rod. However, as mentioned above, the push rod is reversibly screw coupled with the nut and is arranged to turn round in the screwing-out direction when gap adjustment is made when the hydraulic pressure acts between the two pistons. This causes the sealing ring which is mounted on the push rod to turn round together with the push rod. Therefore, the working hydraulic liquid tends to leak.

Further, to prevent excessive adjustment, the above-stated device is arranged to restrain the push rod from rotating by a rotation limiting member which is arranged to come into frictional contact with the head part of the push rod. However, the head part of the push rod comes into contact with the rotation limiting member when cylinders, etc. are elastically deformed by high pressure acting between the two pistons. Therefore, the degree of hydraulic pressure required for preventing the excessive adjustment greatly varies with the coefficient of friction between the head part of the push rod and the rotation limiting member. The arrangement of the device thus tends to result in excessive adjustment.

SUMMARY OF THE INVENTION

This invention is directed to the solution of these problems of the prior art. It is therefore an object of the present invention to provide an automatic gap adjustment device for a disc brake which is capable of eliminating the possibility of any leak of the working hydraulic liquid to the atmospheric pressure side.

To attain the above stated object, an automatic gap adjustment device embodying this invention is disposed within a disc brake, and comprises a cup-shaped piston which has a bottom in the fore end thereof and is arranged to move within a cylinder of a caliper; a sleeve which is axially disposed within the piston and is arranged to be carried by the piston when the piston is moved forward by the action of hydraulic pressure; and a spindle which is in screwed engagement with the piston and is arranged to rotate and screw out from the sleeve rearward relative to the piston. The automatic gap adjustment device is arranged to have the hydraulic pressure received as a moving force directed toward the rear part of the spindle; to have an adjuster piston arranged within a cylinder to push and cause a protruding end part of the spindle which protrudes toward the rear of the sleeve to engage an engaging part provided within the cylinder. The adjuster piston is arranged as follows: When the hydraulic pressure within the cylinder is below a given value, the adjuster piston cancels the pushed engagement by receiving the forward moving force of the spring following the forward motion of the sleeve to allow the spindle to make screwing out rotation. When the hydraulic pressure comes to exceed the given value, the above-stated pushed engagement is maintained to block the screwing out rotation of the spindle.

DETAILED DESCRIPTION OF THE INVENTION

In the above-stated arrangement according to this invention, the whole spindle is kept in the hydraulic liquid working within the cylinder. In preventing the spindle from making excessive adjustment, the hydraulic pressure causing the forward motion of the piston is applied to the adjuster piston disposed within the cylinder to axially move it. The axial movement of the adjuster piston causes the engaging part of the spindle to engage the engaging part disposed within the cylinder in such a way as to restrain the spindle from rotating. This arrangement never causes a seal part attached to the adjuster piston to rotate, so that the working hydraulic liquid within the cylinder can be prevented from leaking to the atmospheric pressure side.

DESCRIPTION OF PREFERRED EMBODIMENT

Figure 2:
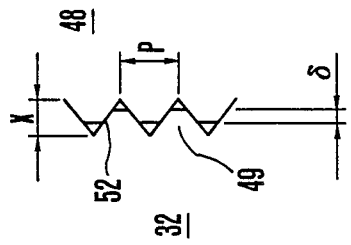
FIG. 2 is a partly developed view showing the head part of a spindle and a lock spindle as in a state of being engaged with each other.
Figure 1:
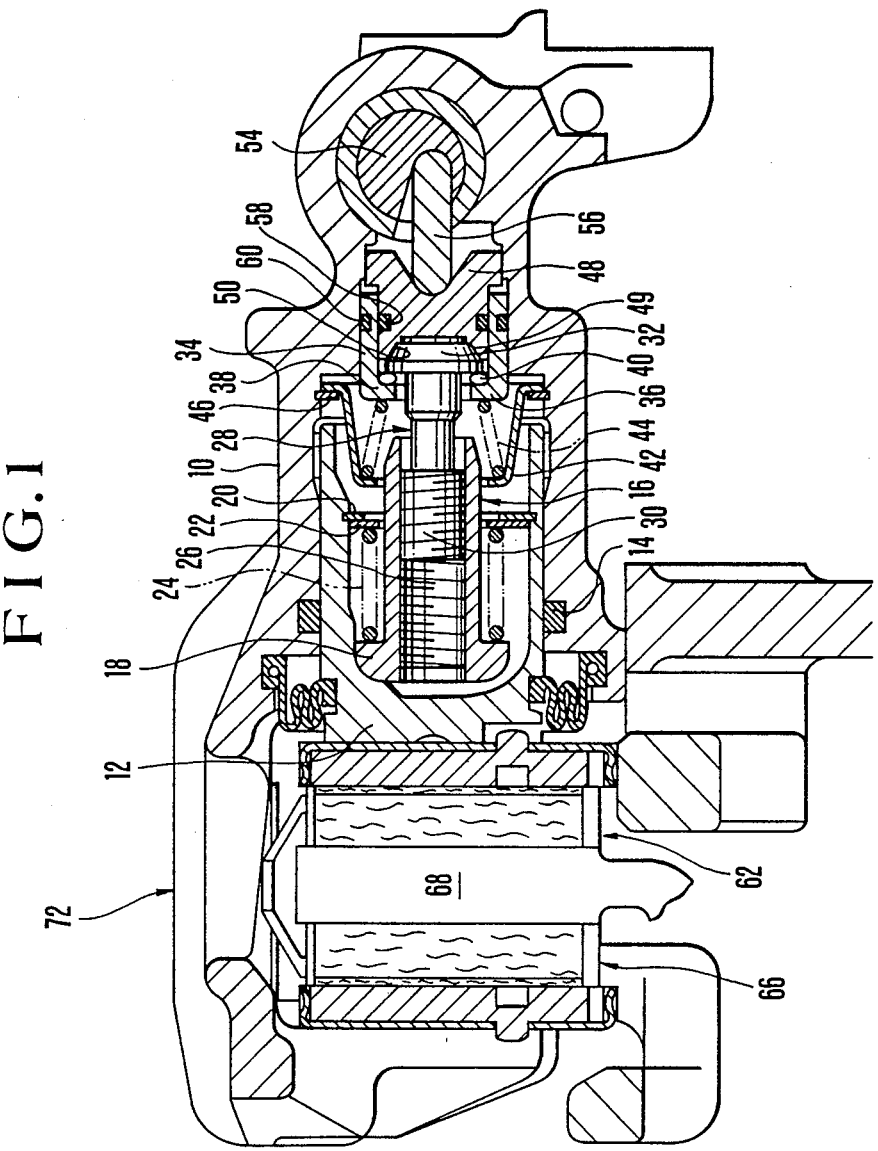
FIG. 1 is a sectional view showing an automatic gap adjusting device for a disc brake arranged according to this invention.

A preferred embodiment of this invention is described with reference to the accompanying drawings as follows: FIG. 1 is a sectional view showing by way of example an automatic gap adjustment device for a disc brake arranged according to this invention. Referring to FIG. 1, a cylinder 10 is formed as a part of a caliper. A cup-shaped piston 12 is inserted into the inside of the cylinder 10. A piston seal 14 is provided along the inner circumference of the cylinder. A sleeve 16 is arranged within this hole to be incapable of rotating but to be axially movable. A flange 18 is formed at one end part of the sleeve 16. A washer 22 is disposed via a cover ring 20. An over-travel spring 24 which is interposed in a compressed state in between the washer 22 and the flange 18 is arranged to push the flange 18 against the bottom of the cup-shaped piston 12.

The inner side of the sleeve 16 is provided with a multiple thread female screw part 26. A male screw part 30 which is formed on the spindle 28 is in screwed engagement with the female screw part 26. The screwed engagement of the female and male screw parts 26 and 30 is arranged to have a back-lash corresponding to a piston returning extent of the sleeve 16 obtained relative to the spindle during a brake release when a gap or clearance between a disc rotor and a friction pad which will be described later herein is appropriate. The above-stated return of the piston 12 is obtained by the restorative force of the elastic deformation of the piston seal 14. A head part 32 is provided on a part of the spindle 28 protruding from the sleeve 16. This head part 32 is inserted into an adjuster piston 34 which is axially movably fitted into the inside of the cylinder 10. The adjuster piston 34 is formed into an approximately cylindrical shape and is provided with an inner flange 38 which forms a pressure receiving face 36 at one end part of the adjuster piston 34 on the side of the sleeve 16. A thrust bearing 40 is disposed between the inner flange 38 and the head part 32 of the spindle 28. An adjust spring 44 is interposed in a compressed state in between the pressure receiving face 36 and a spring case 42. The head part 32 of the spindle 28 is urged to move in the screwing-out direction of the spindle by the adjust spring 44 via the inner flange 38 and the thrust bearing 40. The spring case 42 has a crank-like sectional shape and has its base end part secured to the cylinder 10 by means of a cover ring 46. The urging force of the adjust spring 44 is arranged to be smaller than the urging force of the above-stated over travel spring 24.

The head part 32 of the spindle 28 which is inserted into the adjuster piston 34 has a conically slanting face. The slanting face serves as an engaging part 49 to engage with an engaging part 50 of a lock piston 48 which is arranged within the cylinder 10 to be not rotatable but to be axially movable. The engaging part 49 of the head part 32 and the engaging part 50 of the lock piston 48 are provided with serrations 52. These serrations 52 are, for example, arranged to have a gap X between roots formed on the sides of both the head part 32 and the lock piston 48 at a pitch P which is 0.5 mm. The two engaging parts are thus arranged to engage with each other at an intermeshing degree δ. This intermeshing degree δ is used for stepwise adjustment of the gap between the friction pad and the disc rotor when the gap comes to exceed a given apposite value. The arrangement of the above-stated serrated engaging parts may be changed to engagement of two engaging parts having coarse engaging faces which are sufficiently coarse to prevent the spindle 28 from turning round.

The lock piston 48 is arranged within the cylinder 10 to be axially movable relative to the cylinder but to be not rotatable. One end of the lock piston 48 on the side of the spindle 28 is inserted in the adjuster piston 34 while the other end of the lock piston 48 engages a link 56 which is arranged to be operated by means of a cam shaft 54. An O-ring 58 is fitted on the outer circumference of a portion of the lock piston 48 disposed within the adjuster piston 34 for the purpose of preventing a liquid leak from between the adjuster piston 34 and the lock piston 48. Further, another O-ring 60 is provided on the outer circumferential part of the adjuster piston 34 also for the purpose of preventing a liquid leak from between the adjuster piston 34 and the cylinder 10.

A pad 62 is provided on the end face of the piston 12. The pad 62 is arranged to stop the disc rotor 68 from rotating by squeezing the disc rotor in cooperation with another pad 66 from both sides of the rotor 68. The pad 66 is carried by the caliper 72.

The embodiment which is arranged as described above operates as follows: With brake oil supplied to the inside of the cylinder 10, when hydraulic pressure comes to act between the cylinder 10 and the piston 12, the piston 12 moves to the left as viewed on FIG. 1. The leftward movement of the piston 12 pushes the pad 62 against the disc rotor 68. The cylinder 10 receives a rightward moving force and causes the pad 66 to move to the right via the caliper 72. This causes the pad 66 to be pushed against the disc rotor 68. Therefore, the disc rotor 68 is pushed by the pads 62 and 66 from both sides thereof and is caused to stop from rotating.

At this time, the sleeve 16 is kept in a state of having its end face on the side of the flange 18 pushed against the piston 12 and thus moves to the left along with the piston 12 as the urging force of the over travel spring 24 is greater than that of the adjust spring 44. Since there is a backlash at the screwed engagement part between the sleeve 16 and the spindle 28, the head part 32 is kept in a state of being serration engaged with the non-rotating lock piston 48 by the adjuster piston 34. Therefore, when the disc rotor 68 has an apposite gap between the pads 62 and 66, the spindle 28 does not rotate as the relative moving extent of the spindle 28 and the lock piston 48 is smaller than the intermeshing degree δ.

In case that the gap or clearance between the disc rotor 68 and the pads 62 and 66 comes to exceed a normal value of, say, 0.5 mm due to the wear of linings of the pads 62 and 66, the extent of stroke of the piston 12 increases. Therefore, the spindle 28 is moved leftward as viewed on FIG. 1 while the adjuster piston 34 is pulled out from the fitted engagement part by the sleeve 16. Then, the relative moving extent of the spindle 28 and the lock piston 48 becomes longer than the intermeshing degree δ. When the head part 32 is disengaged from the lock piston 48 as a result of this, the head part 32 of the spindle 28 turns round in the screwing-out direction until it engages the lock piston 48 as the head part 32 is urged through the thrust bearing 40 and the adjuster piston 34 by the adjust spring 44 to move to the right which is the screwing-out direction of the spindle 28. When the hydraulic pressure within the cylinder 10 decreases, the piston 12 is caused by the resilient restoring force of the piston seal 14, etc. to be retracted into the cylinder 10, so that the gap between the disc rotor 68 and each of the pads 62 and 66 can be adjusted to an apposite value.

In case that the brake oil pressure within the cylinder 10 is increased by sudden brake application or the like, the caliper 72 might be elastically deformed by a reaction force from the disc rotor 68. In that case, the forward stroke of the piston 12 relative to the cylinder 10 comes to exceed the normal extent of stroke irrespectively of the wear of the linings of the pads 62 and 66. However, in this instance, a great degree of hydraulic pressure and the urging force of the adjust spring 44 act on the pressure receiving face of the adjuster piston 34. Then, a resultant force resulting from these forces becomes larger than the urging force of the over travel spring 24. This causes the adjuster piston 34 to continuously push the head part 32 of the spindle 28 against the lock piston 48 against the urging force of the over travel spring 24. Therefore, even when the piston 12 moves forward to an extent exceeding the normal stroke, the head part 32 is not disengaged from the lock piston 48. The spindle 28 is prevented from rotating, so that excessive adjustment can be prevented. In this instance, the over travel spring 24 is compressed by the leftward movement of the piston 12.

Meanwhile, the brake oil within the cylinder 10 is prevented from leaking toward a cam 54 which is under atmospheric pressure by virtue of the O-rings 58 and 60 which are provided on the lock piston 48 and the adjuster piston 34. Besides, since the seal part never rotates as both the lock piston 48 and the adjuster piston 34 are arranged to move only in the axial direction, the embodiment gives a high degree of sealing effect.

In the case of this embodiment, the rotating spindle 28 is kept in its entirety in the brake oil within the cylinder 10. This arrangement, therefore, obviates the disadvantage of mounting a seal member on the spindle 28. Since the seal part does not rotate, there is no possibility of a leak of the brake oil to the atmospheric pressure side. Therefore, the reliability of the device can be enhanced. Further, since no seal member is mounted on the spindle 28, stable gap adjustment is ensured by the smooth rotation of the spindle. The head part 32 of the spindle 28 and the lock piston 48 are serration engaged with each other to block the rotation of the spindle 28. That arrangement ensures accurate prevention of excessive adjustment without much fluctuations as the hydraulic pressure required for prevention of excessive adjustment does not depend on the coefficient of friction between them. In addition to this, since the spindle 28 has no seal part, the spindle is capable of readily following the cylinder 10 when there takes place the elastic deformation of the caliper, etc. That enhances the reliability of the device by eliminating any fear with respect to the strength of the device. It is another advantage of the device that the excessive adjustment preventing mechanism can be compactly arranged.

In accordance with this invention, as described in the foregoing, the brake oil within the cylinder can be prevented from leaking to the outside without mounting any seal member on the rotating spindle.

What is claimed is:

1. An automatic gap adjustment device for a disc brake comprising:
    a cup-shaped piston which has a bottom at the fore end thereof and is arranged to move within a cylinder, a sleeve which is axially disposed within said piston and is arranged to follow said piston when said piston is caused to move forward by the action of hydraulic pressure;
    a spindle which is in screwed engagement with said sleeve and is arranged to be capable of screwing out from said sleeve toward he rear of said piston by rotating when said sleeve is moving forward following said piston;
    an adjuster piston arranged within said cylinder to push an engaging part formed at a part of said spindle to protrude toward the rear of said sleeve into engagement with an internal engaging part provided within said cylinder wherein the action of the hydraulic pressure is received as a force of moving said spindle rearward wherein said adjuster piston is in an approximately tubular shape and has a flange;
    said spindle having a head part which is formed at said protruding end part and is inserted into said adjuster piston with said engaging part provided thereon;
    said engaging part is arranged to be pushed via said flange to engage said engaging part within said cylinder;
    said adjuster piston disengaging said engaging parts from the pushed engagement to permit said spindle to have a screwing-out rotation by receiving the forward moving force of the spindle resulting from the forward movement of said sleeve when the hydraulic pressure within said cylinder is below a given value; and
    said adjuster piston maintaining said pushed engagement to prevent said spindle from making the screwing-out rotation when the hydraulic pressure acting within said cylinder exceeds said given value.

2. A device according to claim 1, wherein the engagement of said engaging part of the spindle and the engaging part within said cylinder are serration engagement.

3. A device according to claim 1, wherein the engaging part of said spindle and the engaging part within said cylinder are arranged to have coarse surfaces.

4. A device according to claim 1, wherein either the engaging part of said spindle or the engaging part within said cylinder is formed in a cylindrical shape while the other is in a concave shape.

5. A device according to claim 1, further comprising an over travel spring which is interposed in between said sleeve and said piston; and a spring which has a weaker spring force than said over travel spring and is interposed in between said cylinder and said adjuster piston.

6. An automatic gap adjustment device for a disc brake comprising:
    a cup-shaped piston which has a bottom at the fore end thereof and is arranged to move within a cylinder, a sleeve which is axially disposed within said piston and is arranged to follow said piston when said piston is caused to move forward by the action of hydraulic pressure;
    a spindle which is in screwed engagement with said sleeve and is arranged to be capable of screwing out from said sleeve toward the rear of said piston by rotation when said sleeve is moving forward following said piston;
    an adjuster piston arranged within said cylinder to push an engaging part formed at a part of said spindle to protrude toward the rear of said sleeve into engagement with an internal engaging part provided within said cylinder wherein the action of the hydraulic pressure is received as a force of moving said spindle rearward wherein said adjuster piston is in an approximately tubular shape and has a flange;
    said spindle having a head part which is formed at said protruding end part and is inserted into said adjuster piston with said engaging part provided thereon;
    said engaging part is arranged to be pushed via said flange to engage said engaging part within said cylinder wherein said engaging part within said cylinder is attached to said cylinder and is arranged to be axially movable but to be not rotatable;

a lock piston which is partly inserted into said adjuster piston, said engaging part being provided on said lock position;

said adjuster piston disengaging said engaging parts from the pushed engagement to permit said spindle to have a screwing-out rotation by receiving the forward moving force of the spindle resulting form the forward movement of said sleeve when the hydraulic pressure within said cylinder is below a given value; and said adjuster piston maintaining said pushed engagement to prevent said spindle from making the screwing-out rotation when the hydraulic pressure acting within said cylinder exceeds said given value.

7. An automatic gap adjustment device for a disc brake comprising:

a cup-shaped piston which has a bottom at the fore end thereof and is arranged to move within a cylinder, a sleeve which is axially disposed within said piston and is arranged to follow said piston when said piston is caused to move forward by the action of hydraulic pressure;

a spindle which is in screwed engagement with said sleeve and is arranged to be capable of screwing out from said sleeve toward the rear of said piston by rotating when said sleeve is moving forward following said piston;

an adjuster piston arranged within said cylinder to push an engaging part formed at a part of said spindle to protrude toward the rear of said sleeve into engagement with an internal engaging part provided within said cylinder wherein he action of the hydraulic pressure is received as a force of moving said spindle rearward wherein said adjuster piston is in an approximately tubular shape and has a flange;

said spindle has a head part which is formed at said protruding end part and is inserted into said adjuster piston with said engaging part provided thereon;

said engaging part is arranged to be pushed via said flange to engage said engaging part within said cylinder wherein said engaging part within said cylinder is attached to said cylinder and is arranged to be axially movable but to be not rotatable;

a lock piston which is partly inserted into said adjuster piston, said engaging part being provided on said lock piston;

said adjuster piston disengaging said engaging parts from the pushed engagement to permit said spindle to have a screwing-out rotation by receiving the forward moving force of the spindle resulting form the forward movement of said sleeve when the hydraulic pressure within said cylinder is below a given value;

said adjuster piston maintaining said pushed engagement to prevent said spindle from making the screwing-out rotation when the hydraulic pressure acting within said cylinder exceeds said given value; and seal members which are interposed respective in between said cylinder and said piston, between said cylinder and said adjuster piston and between said adjuster piston and said lock piston.

* * * * *